United States Patent [19]

Voland

[11] Patent Number: 4,867,005

[45] **Date of Patent: * Sep. 19, 1989**

[54] TIMING MECHANISM

[76] Inventor: Elmo W. Voland, 847 E. Stop 11 Rd., Indianapolis, Ind. 46227

[ * ] Notice: The portion of the term of this patent subsequent to Dec. 25, 2001 has been disclaimed.

[21] Appl. No.: 588,377

[22] Filed: Mar. 12, 1984

[51] Int. Cl.[4] .............................................. F16H 53/00

[52] U.S. Cl. ................................ 74/568 T; 200/38 R

[58] Field of Search ............................ 74/568 T, 531; 200/38 R, 38 BA, 37 A

[56] References Cited

U.S. PATENT DOCUMENTS 3,260,129 7/1966 Drain ............................ 200/38 BA
3,500,005 3/1970 Brown ............................... 200/38 B
3,581,028 5/1971 Valbona ............................ 200/38 R
3,602,340 8/1971 Budzich ................................. 74/531
3,737,597 6/1973 Jones et al. ........................... 200/38 R
4,103,119 7/1978 Homan et al. ...................... 200/38 R
4,242,746 12/1980 Schuder et al. .................. 200/38 R
4,490,589 12/1984 Voland ........................... 200/38 BA

*Primary Examiner*—Kenneth J. Dorner
*Assistant Examiner*—Rodney M. Lindsey

[57] ABSTRACT

An O-ring type clutch permits a cam carrying shaft to be manually rotated independent of a motor drive means. A bell is actuated by an actuator that engages a movable switch blade. And cams are connected to a cam carrying shaft through a lost motion connection.

5 Claims, 2 Drawing Sheets

TIMING MECHANISM

BACKGROUND OF THE INVENTION

Generally speaking, the present invention pertains to a timing mechanism which comprises a motor drive means having an output member including at least one leg, a shaft including a circular hub portion having a circular recess therein, a rubber ring tightly and frictionally held within and against an inner wall of the recess, cam means indepedently rotatably carried on the hub portion through a bore in the cam means, coupling means coupling the cam means to the hub portion, and switch means responsive to a rotation of the cam means to be opened and closed thereby.

The present invention pertains to a timing mechanism and more particularly to such a timing mechanism having, among other things, a bi-directional clutch to allow manual rotation of its cams. The invention is particularly useful in timing mechanisms which are used in appliances such as microwave ovens, dryers and dishwashers.

FEATURES OR OBJECTS OF THE INVENTION

A feature of the present invention is to provide a timing mechanism having a clutch which operates from a rubber ring. Another feature of the invention is to provide such a timing mechanism wherein the ring is frictionally held within a hub portion of a shaft. These and other features of the invention will become apparent from the following description taken in conjunction with the accompanying drawings.

DETAILED DESCRIPTION OF THE INVENTION

Figure 1:
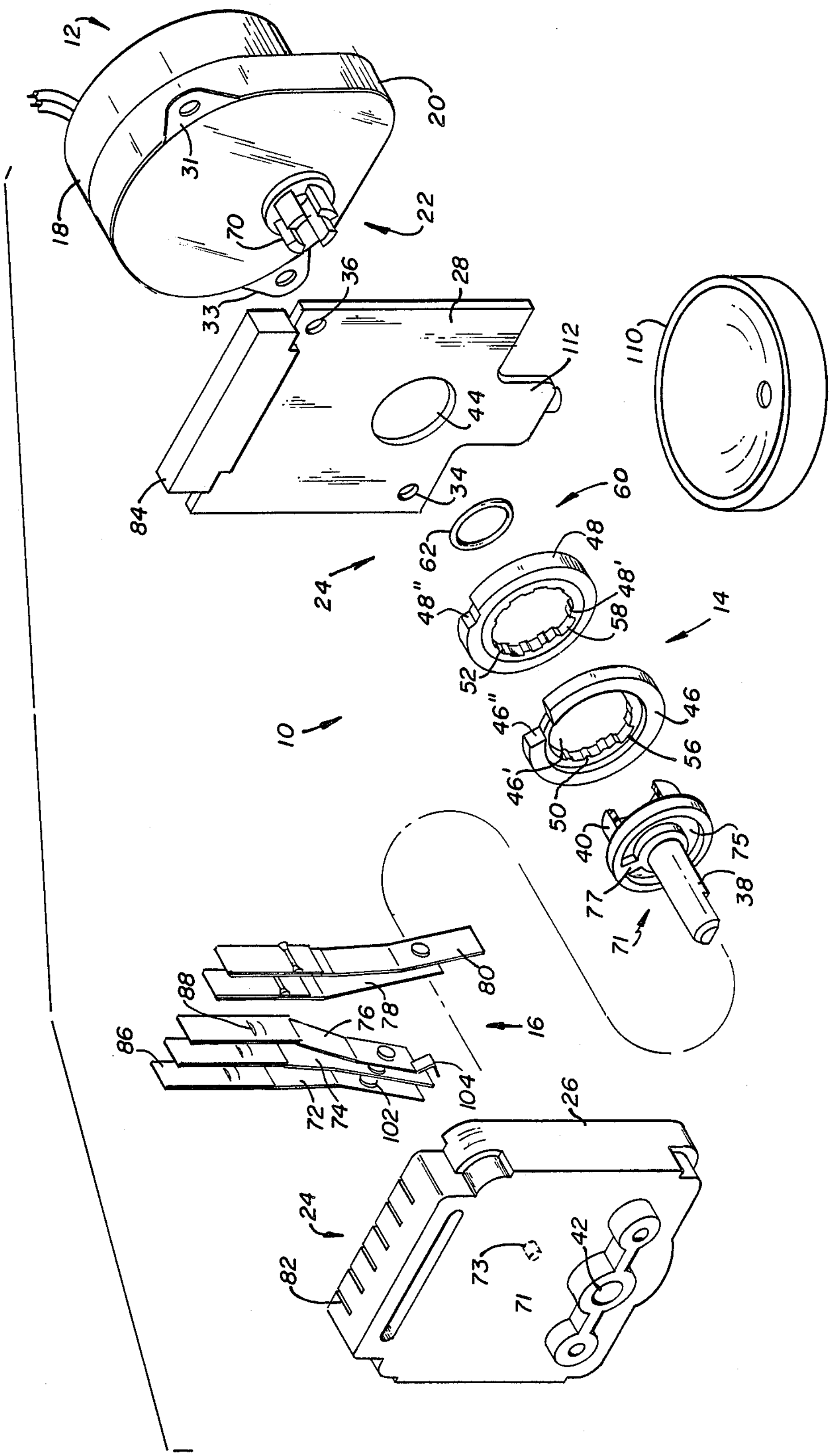
FIG. 1 is an exploded view of a timing mechanism showing the features of the invention.

Referring now to the drawings, there is shown a timing mechanism 10 which in general includes a motor drive means 12, cam means 14, and switch means 16 which are responsive to a rotation of the cam means. Motor drive means 12 includes a synchronous motor 18 and a gear train carried within housing 20 and having an output member 22. Cam means 14 and switch means 16 are carried within a housing 24 which includes a cup-shaped member 26 having an open end which is closed by a cover 28. Motor drive means 12 is carried on the outside of cover 28 through screws which extend through ears 31 and 33, and apertures 34 and 36 and engage threaded bores in cup-shaped member 26.

A shaft 38 includes a hub portion 40 and extends through aperture 42 in cup-shaped member 26 and aperture 44 in cover plate 28. Cam means 14 includes a pair of rings 46 and 48 which are carried on hub 40 through their respective bores 46' and 48'. Each of the bores includes a plurality of ridges 50 and 52 extending lengthwise therein which tend to reduce the rotational friction between the cams and hub 40. Each of the cams are coupled to the hub portion 40 for rotation therewith through a tang 54 (FIG. 2) extending from the hub portion and engaging notches 56 and 58 of the cams. The notches are each somewhat larger than the tang so as to provide a lost motion connection. Such lost motion connection provides for snap action switching.

Figure 2:
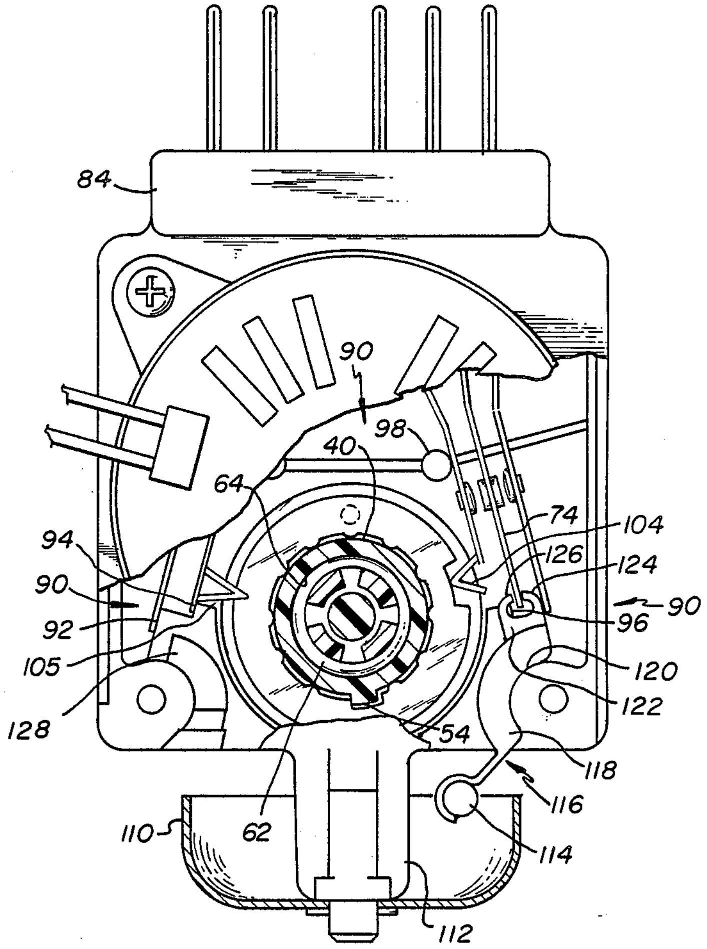
FIG. 2 is an elevation of the timing mechanism in partial cross section.

A clutch 60 permits manual rotation of the cams independent of motor drive means 12. Clutch 60 includes a pliable ring 62 which is frictionally carried against an inner wall of recess 64 of hub portion 40 (FIG. 2). As best shown in FIG. 2, ring 62 tightly fits around legs 70 of output member 22 of motor drive means 12 that are journalled for rotation within recess 64 of the hub. Returning to FIG. 1, the amount of manual rotation may be limited in accordance with a customer's program by a stop means 71. Stop means 71 includes a post 73 which rides in arcuate slot 75 of the hub portion and which engages a ledge 77 provided in the slot at a desired program setting.

The material for the ring 62, hub 40 and legs 70 should be carefully selected in order to provide for sufficient friction to permit the cams to be motor driven and yet allow the cams to be manually set by overcoming the friction between ring 62 and legs 70. A suitable material for the ring would be Nitrile or Buna N (NBR) which is a copolymer of butadiene and acrylonitrile manufactured by the Seal Group of Parker Hannifin Corp. For hub 40, an unfilled polyester such as Celanex 2012 manufactured by Celanese Plastic Co. has been found to be suitable, while for legs 70 a glass filled nylon such as Celanese 1503-2 Nylon is suitable.

If desired, more than one ring could be used to vary the torque level of the clutch. For example, two rings may be desirabl when higher torque is needed.

Switch means 16 includes a plurality of movable blades 72, 74, 76, 78 and 80 which are carried in slots 82 of cup-shaped member 26 and are held in place by terminal block 84 which is carried by cover plate 28. As shown, each of the spring blades is integrally constructed with electrical terminals 86. The blades, with their terminals, are rigidly held within each of the slots 82 through projections 88 that are lanced from the blade and terminals and carried in notches formed in slots 82 (not shown) adapted to mate the projections.

Each of the spring blades includes mating electrical contacts 102 and blades 76 and 78 each include cam followers 104 and 105 which engage cams 46 and 48 to be opened and closed through notches 46'' and 48'' of the cams. Movement of blades 78 and 80 is limited by stop means 90. Stop means 90 (FIG. 2) includes shelves formed by steps 92, 94 and 96 and shelf formed by post 98. Such stop means holds the blades at a predetermined spacing.

Referring to FIG. 2, the timing mechanism also includes an alarm device for signaling the end of a cycle. The alarm device includes a bell 110 that is carried on a stem 112 of cover plate 28. The bell includes a striker 114. Striker 114 is actuated by an actuating means 116 which includes a slider 118 carried in arcuate slot 120 and having a distal end 122 which includes a pair of fingers 124 and 126 which engages movable blade 74 of switch means 16. Movement of blade 74 causes the slider 118 to move within the arcuate slot 120 and actuate the striker 114 to sound the bell. A shelf 96 limits the throw of the slider. A corresponding arcuate slot 128 is provided on the opposite side of the housing so that the position of the bell may be changed.

In operation, cams 46 and 48 are manually rotated through shaft 38 independent of motor drive means 12 through ring 62 overcoming the friction between it and legs 70 to provide a desired program. Power driven rotation is applied from motor drive means 12 through legs 70 of output member 22 which engage ring 62 to rotate hub 40 through the ring's frictional engagement with the hub. Rotation of hub 40 causes rotation of cams 46 and 48 through lost motion connection provided between tang 54 of the hub and notches 56 and 58. When spring blade 74 is moved (usually at the end of a cycle) to open its mating contacts to shut off the motor drive means, slider 118 is moved to actuate bell 110 through striker 114.

What is claimed is:

1. A timing mechanism comprising:

(a) a motor drive means having an output member including at least two legs, (b) a shaft including a circular hub portion having a circular recess therein, (c) at least one rubber ring held within and against an inner wall of said recess, and tightly around said legs, (d) cam means independently rotatably carried on said hub portion through a bore in said cam means, (e) coupling means coupling said cam means to said hub portion, and (f) switch means responsive to a rotation of said cam means to be opened and closed thereby.

2. A timing mechanism according to claim 1 wherein said coupling means includes a lost motion connection.

3. A timing mechanism according to claim 2 wherein said lost motion connection includes a tab extending from said hub portion and a notch in said bore receiving said tab, said notch being slightly larger than the size of said tab.

4. A timing mechanism according to claim 1 wherein said cam means includes two independently operable rings and said coupling means includes two lost motion connections, one each between each ring and said hub portion.

5. A timing mechanism according to claim 1 wherein said ring is fabricated from a copolymer of butadiene and acrylonitrile, said hub of an unfilled polyester and said legs of glass filled nylon.

* * * * *